United States Patent
Nam et al.

(10) Patent No.: US 10,451,916 B2
(45) Date of Patent: Oct. 22, 2019

(54) POLARIZING PLATE COMPRISING POLYETHYLENE TEREPHTHALATE PROTECTIVE FILM, METHOD FOR MANUFACTURING SAME, AND IMAGE DISPLAY DEVICE AND LIQUID-CRYSTAL DISPLAY DEVICE COMPRISING SAME

(71) Applicant: LG CHEM, LTD., Seoul (KR)

(72) Inventors: Sung Hyun Nam, Daejeon (KR); Seunghee Nam, Daejeon (KR); Kyun II Rah, Daejeon (KR); Dae Woong Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 239 days.

(21) Appl. No.: 15/303,484

(22) PCT Filed: May 22, 2015

(86) PCT No.: PCT/KR2015/005214
§ 371 (c)(1),
(2) Date: Oct. 11, 2016

(87) PCT Pub. No.: WO2015/178741
PCT Pub. Date: Nov. 26, 2015

(65) Prior Publication Data
US 2017/0031073 A1 Feb. 2, 2017

(30) Foreign Application Priority Data
May 22, 2014 (KR) .................. 10-2014-0061527

(51) Int. Cl.
*G02F 1/1335* (2006.01)
*B32B 7/12* (2006.01)
(Continued)

(52) U.S. Cl.
CPC .......... *G02F 1/133528* (2013.01); *B32B 7/12* (2013.01); *B32B 23/08* (2013.01);
(Continued)

(58) Field of Classification Search
CPC .......... G02B 1/14; G02B 5/30; G02B 5/3033; G02B 5/305; G02F 1/133528; G02F 1/13363; G02F 2202/28; Y10T 428/105
See application file for complete search history.

(56) References Cited

U.S. PATENT DOCUMENTS

| 3,670,048 A | * | 6/1972 | Magat et al. | ............... C08J 7/18 522/134 |
| 2008/0055523 A1 | * | 3/2008 | Nishihara | ......... G02F 1/133504 349/96 |
| 2008/0278810 A1 | * | 11/2008 | Kim | ....................... C09J 129/04 359/485.01 |

(Continued)

FOREIGN PATENT DOCUMENTS

| CN | 103108931 A | | 5/2013 |
| JP | 07242758 A | * | 9/1995 |
| JP | 2005512309 A | | 4/2005 |
| JP | 5036251 B2 | | 9/2012 |

(Continued)

*Primary Examiner* — Sophie Hon
(74) *Attorney, Agent, or Firm* — Dentons US LLP (57) ABSTRACT

The present invention relates to a polarizing plate including a water-based adhesive layer, a primer layer, and a polyethylene terephthalate protection film sequentially provided on at least one surface of a polarizer, in which the water-based adhesive layer is formed by using a water-based adhesive including a polyvinyl alcohol-based resin, an amine-based metal compound, and a pH adjuster, and the pH adjuster includes epoxy (meth)acrylate, alcohol, and acid, and a method for manufacturing the same.

17 Claims, 4 Drawing Sheets

(51) Int. Cl.
   *B32B 23/08*   (2006.01)
   *B32B 27/36*   (2006.01)
   *G02B 5/30*    (2006.01)
   *G02B 1/14*    (2015.01)
   *B32B 27/08*   (2006.01)
   *B32B 27/32*   (2006.01)
   *G02F 1/13363* (2006.01)

(52) U.S. Cl.
   CPC .............. *B32B 27/08* (2013.01); *B32B 27/32* (2013.01); *B32B 27/322* (2013.01); *B32B 27/36* (2013.01); *B32B 27/365* (2013.01); *G02B 1/14* (2015.01); *G02B 5/305* (2013.01); *G02B 5/3033* (2013.01); *B32B 2255/10* (2013.01); *B32B 2255/26* (2013.01); *B32B 2307/42* (2013.01); *B32B 2307/514* (2013.01); *B32B 2457/202* (2013.01); *G02F 1/13363* (2013.01); *G02F 2202/28* (2013.01); *Y10T 428/105* (2015.01)

(56) References Cited

U.S. PATENT DOCUMENTS

| | | |
|---|---|---|
| 2009/0253865 A1 | 10/2009 | Shibutani et al. |
| 2010/0165263 A1 | 7/2010 | Lee et al. |
| 2013/0162930 A1 | 6/2013 | Shin et al. |
| 2013/0164677 A1 | 6/2013 | Kennedy et al. |
| 2013/0244041 A1 | 9/2013 | Cho et al. |
| 2014/0293197 A1* | 10/2014 | Shin ................... G02B 5/3083 349/96 |

FOREIGN PATENT DOCUMENTS

| | | | |
|---|---|---|---|
| JP | 5042986 B2 | 10/2012 | |
| KR | 10-2007-0078734 A | 8/2007 | |
| KR | 10-2009-0023975 A | 3/2009 | |
| KR | 10-2010-0068178 A | 6/2010 | |
| KR | 10-2011-0075998 A | 7/2011 | |
| KR | 20120030975 A * | 3/2012 | ............... C09J 4/00 |
| KR | 10-2013-0074665 A | 7/2013 | |
| KR | 101337005 B1 * | 12/2013 | ........... G02B 5/3083 |

* cited by examiner

COMPARATIVE EXAMPLE 3    EXAMPLE 1

[Figure 6]

POLARIZING PLATE COMPRISING POLYETHYLENE TEREPHTHALATE PROTECTIVE FILM, METHOD FOR MANUFACTURING SAME, AND IMAGE DISPLAY DEVICE AND LIQUID-CRYSTAL DISPLAY DEVICE COMPRISING SAME

TECHNICAL FIELD

This application is a National Stage Entry of International Application No. PCT/KR2015/005214 filed May 22, 2015, and claims priority to and the benefits of Korean Patent Application No. 10-2014-0061527 filed May 22, 2014, each of which is incorporated by reference for all purposes as if fully set forth herein.

The present invention relates to a polarizing plate and a method for manufacturing the same, and more particularly, to a polarizing plate including a polyethylene terephthalate film on at least one surface thereof as a protection film and having excellent durability and optical properties, and a method for manufacturing the same.

BACKGROUND ART

A polarizing plate has been generally used as a structure where a protection film is laminated on one surface or both surfaces of a polarizer formed of a polyvinyl alcohol (hereinafter, referred to as 'PVA')-based resin dyed with a dichromatic dye or iodine by using an adhesive. In the related art, a triacetyl cellulose (TAC)-based film has been mainly used as the protection film for the polarizing plate, but there is a problem in that in the case of the TAC film, since moisture permeability is high, the TAC film is easily deformed under the high temperature and high humidity environment. Accordingly, recently, protection films of various materials which can replace the TAC film have been developed, and for example, a method where polyethylene terephthalate (PET), cycloolefin polymer (COP), and acryl-based films, and the like are used alone or are used while being mixed is proposed.

Among them, since the polyethylene terephthalate film has lower costs and excellent durability as compared to the other polymer films, in order to reduce manufacturing costs of the polarizing plate, attempts for using the polyethylene terephthalate film as the protection film for the polarizer have continued. However, there is a problem in that in the case of the polyethylene terephthalate film, since adhesion force with a polyvinyl alcohol-based adhesive used for adhesion of the polarizer and the protection film in the related art is low, after the polarizing plate is manufactured, stripping and lifting of the protection film and the like easily occur to degrade an optical property and durability of the polarizing plate.

Further, there is a problem in that since the polyethylene terephthalate film has a refractive index and a retardation value that are higher than those of the other polymer film, in the case where the polyethylene terephthalate film is applied as the protection film, optical inferiority, such as a reduction in transmittance of the polarizing plate due to an increase in reflectance or the occurrence of a rainbow phenomenon due to an interference effect, occurs.

Therefore, there is a demand for a technology of developing a polarizing plate having excellent durability to not easily cause deformation even under a high temperature and high humidity environment and having an excellent optical property even though a polyethylene terephthalate film is used as a protection film.

DETAILED DESCRIPTION OF THE INVENTION

Technical Problem

The present invention has been made in an effort to provide a polarizing plate including a polyethylene terephthalate protection film and a water-based adhesive and having excellent durability and optical properties even under a high temperature and high humidity environment, and a method for manufacturing the same.

Technical Solution

In one aspect, the present invention provides a polarizing plate including: a water-based adhesive layer, a primer layer, and a polyethylene terephthalate protection film sequentially provided on at least one surface of a polarizer, in which the water-based adhesive layer is formed by using a water-based adhesive including a polyvinyl alcohol-based resin, an amine-based metal compound, and a pH adjuster, and the pH adjuster includes epoxy (meth)acrylate, alcohol, and acid.

In this case, a pH of the water-based adhesive may be about 4 to 9, preferably about 5 to 8, and more preferably about 5.5 to 7.6, and the pH adjuster may include 0.001 parts by weight to 10 parts by weight of epoxy (meth)acrylate, 10 parts by weight to 50 parts by weight of alcohol, and 30 parts by weight to 80 parts by weight of acid, based on 100 parts by weight of the pH adjuster.

Meanwhile, the water-based adhesive preferably includes 1 part by weight to 50 parts by weight of the amine-based metal compound and 0.0001 parts by weight to 5 parts by weight of the pH adjuster, based on 100 parts by weight of the polyvinyl alcohol-based resin, but is not limited thereto.

Next, the primer layer may include an acryl-based unit and a polyester unit, and if necessary, may further include a styrene-based unit.

Next, the polyethylene terephthalate protection film may be a stretched polyethylene terephthalate film, and in this case, an in-plane retardation value of the stretched polyethylene terephthalate film may be about 4000 nm to 10000 nm.

Meanwhile, in the polarizing plate of the present invention, the stretched polyethylene terephthalate film may be provided on one surface of the polarizer, and a triacetyl cellulose film, a cycloolefin polymer film, a norbornene film, a polycarbonate film, an acryl film, or a polyethylene terephthalate film may be provided on the other surface of the polarizer. In the present specification, the other surface of the polarizer means a surface of the polarizer, on which the (stretched) polyethylene terephthalate film is not provided.

In another aspect, the present invention provides a method for manufacturing a polarizing plate, including: forming a primer layer and a water-based adhesive layer between a polarizer and a polyethylene terephthalate protection film; and attaching the polyethylene terephthalate protection film onto at least one surface of the polarizer via the water-based adhesive layer and the primer layer, in which the water-based adhesive layer is formed by using a water-based adhesive including: a polyvinyl alcohol-based resin; an amine-based metal compound; and a pH adjuster including epoxy (meth)acrylate, alcohol, and acid.

In this case, the attaching of the polyethylene terephthalate protection film onto at least one surface of the polarizer may be performed by a method of laminating the polarizer and the polyethylene terephthalate protection film and then performing drying at a temperature of 20° C. to 100° C. to cure the water-based adhesive layer and the primer layer.

Further, if necessary, the method for manufacturing the polarizing plate according to the present invention may further include: attaching a triacetyl cellulose film, a cycloolefin polymer film, a norbornene film, a polycarbonate film, or an acryl film onto the other surface of the polarizer, on which the polyethylene terephthalate protection film is not laminated.

In yet another aspect, the present invention provides an image display including: the polarizing plate of the present invention.

Further, the present invention provides a liquid crystal display including: a liquid crystal display panel including an upper substrate, a lower substrate, and a liquid crystal cell interposed between the upper substrate and the lower substrate; a backlight unit disposed at a lower portion of the lower substrate; and the polarizing plate disposed between the liquid crystal panel and the backlight unit.

Advantageous Effects

In a polarizing plate of the present invention, an inexpensive polyethylene terephthalate film is used as a protection film, and thus manufacturing costs are low and excellent optical properties and durability are secured.

BEST MODE

Hereinafter, the present invention will be more specifically described.

The present inventors have studied repeatedly to develop a polarizing plate having high adhesion force to a polyethylene terephthalate film even though a water-based adhesive is used and having excellent optical properties, and as a result, found that the aforementioned objects can be achieved by adding a predetermined pH adjuster together with an amine-based metal compound to the water-based adhesive to form an adhesive layer, thereby accomplishing the present invention.

To be more specific, the polarizing plate of the present invention includes a water-based adhesive layer, a primer layer, and a polyethylene terephthalate protection film sequentially provided on at least one surface of a polarizer, in which the water-based adhesive layer is formed by using a water-based adhesive including a polyvinyl alcohol-based resin, an amine-based metal compound, and a pH adjuster, and the pH adjuster includes epoxy (meth)acrylate, alcohol, and acid.

Hereinafter, constitutional elements of the polarizing plate of the present invention will be more specifically described.

[Polarizer]

The polarizer capable of being used in the present invention is not particularly limited, but may be polarizers generally used in the corresponding technical field, for example, a film aligned in a predetermined direction by adsorbing a polarizing material, such as iodine or a dichromatic dye, on a hydrophilic polymer film, such as a polyvinyl alcohol-based film, a partially formalized polyvinyl alcohol-based film, and an ethylene.vinyl acetate copolymer-partially saponified film, and performing elongation, a polyene-based aligned film such as a dehydrated substance of polyvinyl alcohol or a dechlorinated substance of polyvinyl chloride, or the like, and preferably a polyvinyl alcohol-based polarizer where molecular chains containing an iodine-based compound or a dichromatic polarizing material are aligned in a predetermined direction.

Meanwhile, the polyvinyl alcohol-based polarizer may be manufactured by a manufacturing method of the polyvinyl alcohol-based polarizer well known in the corresponding technical field, and the manufacturing method is not particularly limited. For example, the polarizer capable of being used in the present invention may be manufactured by impregnating a non-stretched polyvinyl alcohol-based film in an iodine and/or dichromatic dye aqueous solution to perform exhaustion, followed by crosslinking and elongation, or may be manufactured by applying a polyvinyl alcohol-based resin on a polymer base film or laminating or adhering the polyvinyl alcohol-based film on or onto the polymer base film to form a film laminate, impregnating the film laminate in the iodine and/or dichromatic dye aqueous solution to perform exhaustion, followed by crosslinking, elongation, and separating from the polymer base film.

Alternatively, the polyvinyl alcohol-based polarizer may be used by purchasing products commercially available on the market.

[Water-based Adhesive Layer]

The water-based adhesive layer of the present invention is formed by using the water-based adhesive including the polyvinyl alcohol-based resin, the amine-based metal compound, and the pH adjuster. In this case, the water-based adhesive may preferably include 1 part by weight to 50 parts by weight of the amine-based metal compound and 0.0001 parts by weight to 5 parts by weight of the pH adjuster, based on 100 parts by weight of the polyvinyl alcohol-based resin, but is not limited thereto.

In the case where contents of the polyvinyl alcohol-based resin, the amine-based metal compound, and the pH adjuster of the water-based adhesive satisfy the aforementioned range, the water-based adhesive layer may have excellent adhesion force and may attach the polarizer and the polyethylene terephthalate protection film. Further, in the case where the contents of the polyvinyl alcohol-based resin, the amine-based metal compound, and the pH adjuster of the water-based adhesive deviate from the aforementioned range, there is a problem in that due to a lack of adhesion force of the water-based adhesive layer, it is difficult to manufacture the polarizing plate.

The polyvinyl alcohol-based resin is used in order to adhere a polarizing element and a protection film in the related art, any polyvinyl alcohol-based resin known in the corresponding technical field may be used without a limit, and a kind of the polyvinyl alcohol-based resin is not particularly limited. For example, in the present invention, as the polyvinyl alcohol-based resin, a polyvinyl alcohol resin, a denatured polyvinyl alcohol resin including one kind or more functional groups selected from the group consisting of an acetoacetyl group, a carboxylic acid group, an acryl group, and a urethane group, and the like may be used. In the case where the denatured polyvinyl alcohol-based resin including one kind or more functional groups selected from the group consisting of the acetoacetyl group, the carboxylic acid group, the acryl group, and the urethane group is used, the polyvinyl alcohol-based resin may be a polyvinyl alcohol-based resin denatured in the content of at most 15 mol %, preferably 0.01 to 15 mol %, and more preferably 0.5 to 8 mol % by at least one kind or more selected from the group consisting of the acetoacetyl group, the carboxylic acid group, the acryl group, and the urethane group, but is not limited thereto.

According to the exemplary embodiment of the present invention, the polyvinyl alcohol-based resin included in the water-based adhesive may be a polyvinyl alcohol-based resin containing the acetoacetyl group. Meanwhile, among them, an acetoacetyl group denatured polyvinyl alcohol-based resin is particularly preferable. This is because there is an effect in that in the case where the acetoacetyl group denatured polyvinyl alcohol-based resin is used, in addition to a hydrogen bond by a hydroxy group, a covalent bond between the amine-based metal compound and the acetoacetyl group is formed to improve adhesion force of the adhesive and water resistance and prevent stains of the adhesive and the like and thus improve a quality.

Meanwhile, it is preferable that the average degree of polymerization of the polyvinyl alcohol-based resin and/or the denatured polyvinyl alcohol-based resin included in the water-based adhesive according to the present invention be about 500 to 1800. The average degree of polymerization of 500 to 1800 represents excellent physical properties in terms of an adhesion property according to a viscosity, a solid, and a use amount.

Meanwhile, a number average molecular weight (Mn) and a weight average molecular weight (Mw) of the polyvinyl alcohol-based resin used as the water-based adhesive according to the present invention may be about 3,000 to 12,000, and about 20,000 to 100,000, respectively. This is because the polyvinyl alcohol-based resin having the number average molecular weight and/or the weight average molecular weight in the aforementioned range is suitable to be used as the adhesive in terms of the viscosity and has sufficient water resistance after crosslinking.

Next, the amine-based metal compound is configured to crosslink the primer layer and the adhesive layer, and according to research of the present inventors, in the case where the amine-based metal compound is included in the adhesive, adhesion force and water resistance of the adhesive are significantly improved, and after corona treatment with a film having a non-polar surface property, such as the cycloolefin-based film, as well as a film having a polar surface property, such as the triacetyl cellulose film, adhesion force is improved.

It is preferable that the amine-based metal compound usable in the present invention be a metal complex-type compound containing an amine-based ligand as a water-soluble compound having a functional group having reactivity with the polyvinyl alcohol-based resin. In this case, a central metal of the amine-based metal compound is preferably a transition metal, and may be, for example, zirconium (Zr), titanium (Ti), hafnium (Hf), tungsten (W), iron (Fe), cobalt (Co), nickel (Ni), ruthenium (Ru), osmium (Os), rhodium (Rh), iridium (Ir), palladium (Pd), platinum (Pt), and the like. Further, as the ligand bonded to the central metal, ligands including at least one or more amine groups such as primary amine, secondary amine, tertiary amine, or ammonium hydroxide may be used without a limit.

Meanwhile, in the water-based adhesive, it is preferable that the amine-based metal compound is included in a content of about 1 part by weight to 50 parts by weight, preferably about 2 parts by weight to 45 parts by weight, and more preferably about 3 parts by weight to 40 parts by weight, based on 100 parts by weight of the polyvinyl alcohol-based resin. In the case where the content of the amine-based metal compound satisfies the aforementioned numerical range, an excellent effect may be obtained in terms of adhesion force, water resistance, and polarizing plate optical properties.

Next, the pH adjuster is configured to adjust the pH of the water-based adhesive, and includes epoxy (meth)acrylate, alcohol, and acid. To be more specific, the pH adjuster of the present invention may include 0.001 parts by weight to 10 parts by weight of epoxy (meth)acrylate, 10 parts by weight to 50 parts by weight of alcohol, and 30 parts by weight to 80 parts by weight of acid, based on 100 parts by weight of the pH adjuster. According to research of the present inventors, in the case where as the pH adjuster, epoxy (meth)acrylate and alcohol are used while being mixed with acid like the present invention, as compared to the case where an acid solution is used alone, solubility of the adhesive to water is further improved, and there is an effect of improving adhesion force of the polarizing element and the protection film and improving stains of the adhesive.

In the present invention, the epoxy (meth)acrylate is (meth)acrylate including an epoxy group, and may be, for example, glycidyl methacrylate or glycidyl acrylate. The alcohol may be lower alcohol such as methanol, ethanol, propanol, and butanol, and among them, methanol is particularly preferable. Further, as the acid, hydrochloric acid, sulfuric acid, nitric acid, and the like may be used, and among them, hydrochloric acid is particularly preferable. Specifically, the pH adjuster may include 0.001 parts by weight to 10 parts by weight of glycidyl methacrylate, 10 parts by weight to 50 parts by weight of methanol, and 30 parts by weight to 80 parts by weight of hydrochloric acid, based on 100 parts by weight of the pH adjuster.

The pH of the water-based adhesive including the aforementioned components according to the present invention may be about 4 to 9, preferably about 5 to 8, and more preferably about 5.5 to 7.5. This is because in the case where the pH of the water-based adhesive layer satisfies the aforementioned range, optical and appearance properties of the polarizing plate including the polyethylene terephthalate film may be excellently maintained.

In the case where the pH of the water-based adhesive satisfies the aforementioned range, the water-based adhesive layer may have excellent adhesion force and may attach the polarizer and the polyethylene terephthalate protection film. Further, in the case where the pH of the water-based adhesive deviates from the aforementioned range, there is a problem in that due to a lack of adhesion force of the water-based adhesive layer, it is difficult to manufacture the polarizing plate.

Meanwhile, the water-based adhesive may further include water as a solvent in order to improve the viscosity and workability, and in this case, a content of a solid in the water-based adhesive may be about 1 to 10 wt % and more preferably about 2 to 7 wt %.

Meanwhile, it is preferable that a thickness of the water-based adhesive layer formed by using the water-based adhesive be about 20 nm to 2000 nm. This is because in the case where the thickness of the water-based adhesive layer is less than 20 nm, adhesion force may be reduced, and in the case where the thickness is more than 2000 nm, drying efficiency may be reduced to negatively affect adhesion force, water resistance, and an optical property of the polarizing plate.

Meanwhile, the water-based adhesive layer may be formed by applying the water-based adhesive on one surface of the polarizer, or may be formed by forming a primer layer, which will be described later, on the polyethylene terephthalate protection film and then applying the water-based adhesive on the primer layer.

[Primer Layer]

The primer layer of the present invention is configured to improve adhesion force of the water-based adhesive layer and the polyethylene terephthalate protection film and water resistance of the polarizing plate, and may include an acryl-based unit and a polyester unit, but the units are limited thereto.

In this case, the acryl-based unit means a unit derived from a (meth)acryl-based compound, and in this case, the (meth)acryl-based compound preferably includes, for example, one kind or more selected from the group consisting of alkyl (meth)acrylate, cycloalkyl (meth)acrylate, epoxy (meth)acrylate, hydroxyalkyl acrylate, alkyl(meth)acrylic acid, a polymer or a copolymer thereof, and the like, but the examples are not limited thereto. Among them, it is preferable that the (meth)acryl-based compound include $C_{1-10}$ alkyl (meth)acrylate, and it is particularly preferable that the (meth)acryl-based compound include methyl methacrylate or ethyl methacrylate. Meanwhile, the (meth)acryl-based compound may be a monomer type, an oligomer, a homopolymer, or a copolymer type where two kinds or more monomers are copolymerized.

Next, the polyester-based unit means a unit derived from a compound including an ester group formed by a reaction of carboxylic acid and alcohol at a main chain thereof, and for example, may be a unit derived from polyester glycol formed by a reaction of polybasic acid and polyol.

In this case, examples of the polybasic acid component may include aromatic dicarboxylic acid such as orthophthalic acid, isophthalic acid, terephthalic acid, 1,4-naphthalenedicarboxylic acid, 2,5-naphthalenedicarboxylic acid, 2,6-naphthalenedicarboxylic acid, biphenyldicarboxylic acid, and tetrahydrophthalic acid; aliphatic dicarboxylic acid such as oxalic acid, succinic acid, malonic acid, glutaric acid, adipic acid, pimelic acid, suberic acid, azelaic acid, sebacic acid, linoleic acid, maleic acid, fumaric acid, mesaconic acid, and itaconic acid; alicyclic dicarboxylic acid such as hexahydrophthalic acid, tetrahydrophthalic acid, 1,3-cyclohexanedicarboxylic acid, and 1,4-cyclohexanedicarboxylic acid; a reactive derivative such as acid anhydride, alkyl ester, and acid halide thereof, and the like. The examples may be used alone or in combination of two kinds or more. Among the examples, the terephthalic acid, the isophthalic acid, the succinic acid, and the like are particularly preferable. Further, the case where the isophthalic acid substituted by sulfonate is used as basic acid is particularly preferable in terms of water dispersibility.

Meanwhile, the polyol is not particularly limited as long as polyol has two or more hydroxyl groups in a molecule thereof, and predetermined appropriate polyol may be adopted. For example, the polyol is preferably at least one kind or more selected from the group consisting of ethylene glycol, 1,2-propanonediol, 1,3-propanediol, 1,3-butanediol, 1,4-butanediol, neopentyl glycol, pentanediol, 1,6-hexanediol, 1,8-octanediol, 1,10-decanediol, 4,4'-dihydroxyphenylpropane, 4,4'-dihydroxymethylmethane, diethylene glycol, triethylene glycol, polyethylene glycol (PEG), dipropylene glycol, polytetramethylene glycol (PTMG), polypropylene glycol (PPG), 1,4-cyclohexanedimethanol, 1,4-cyclohexanediol, bisphenol A, bisphenol F, glycerin, 1,1,1-trimethylolpropane, 1,2,5-hexatriol, pentaerythriol, glucose, sucrose, and sorbitol. Further, the case where dimethylolalkanoic acid, dimethylolacetic acid, dimethylolpropionic acid, and dimethylolbutanoic acid containing a carboxyl group are used alone or in combination of two kinds or more as polyol is particularly preferable in terms of water dispersibility.

Meanwhile, it is preferable that the polyester glycol be formed by reacting the polybasic acid and polyol at the mole ratio of 2.5:1 to 1:2.5, preferably 2.3:1 to 1:2.3, and more preferably 2:1 to 1:2. This is because in the case where the reaction mole ratio of the polybasic acid and polyol deviates from the aforementioned range, an odor may be generated or coating defects may be caused by unreacted monomers.

Meanwhile, it is preferable that the primer layer of the present invention be manufactured by the composition including the polyester-based compound and the acryl-based compound at the weight ratio of 1:9 to 9:1, preferably 2:8 to 8:2, and more preferably 3:7 to 7:3. This is because in the case where the weight ratio of the polyester-based compound and the acryl-based compound satisfies the aforementioned numerical range, properties such as adhesion force between the adhesion layer and the protection film and water resistance may be embodied to be excellent.

Meanwhile, if necessary, the primer layer may further include a styrene-based unit. The styrene-based unit may improve adhesion force between the adhesion layer and the protection film, and moreover, improve water resistance of the polarizing plate. Specifically, it can be confirmed through the following Experimental Example 2 that in the case where the primer layer further includes the styrene-based unit, even though the polarizing plate is immersed in water at 60° C. for 4 hours or more, a stripping phenomenon of the polarizer and the protection film is improved.

The styrene-based unit means a unit derived from the styrene-based compound, and examples of the styrene-based compound may include one kind or more selected from the group consisting of styrene, α-methyl styrene, α-ethyl styrene, 3-methyl styrene, p-methyl styrene, p-ethyl styrene, p-propylene styrene, 4-(p-methylphenyl) styrene, 1-vinylnaphthalene, p-chlorostyrene, m-chlorostyrene, and p-nitrostyrene, but are not limited thereto. Meanwhile, the styrene-based compound may be a monomer type, an oligomer, a homopolymer, or a copolymer type where two kinds or more monomers are copolymerized.

Meanwhile, in the case where the styrene-based unit is included in the primer layer, it is preferable that the primer layer be manufactured by the composition including the acryl-based compound and the styrene-based compound at the weight ratio of 1:9 to 9:1, preferably 2:8 to 8:2, and more preferably 3:7 to 7:3. In the case where the weight ratio of the acryl-based compound and the styrene-based compound satisfies the aforementioned numerical range, compatibility of the polyester compound and the acryl-based compound is improved, and water resistance and adhesion force of the polarizing plate are more excellent.

It is preferable that the thickness of the primer layer formed by using the aforementioned primer composition be about 20 nm to 4000 nm. In the case where the thickness of the primer layer is less than 20 nm, an adhesion force improvement effect is insignificant, and when the thickness thereof is more than 4000 nm, the primer layer is nonuniformly coated, and drying efficiency may be reduced.

The primer layer may be provided between the polyethylene terephthalate protection film and the water-based adhesive layer. Meanwhile, the primer layer may be formed by a method of forming the water-based adhesive layer on one surface of the polarizer and then applying the primer composition on the water-based adhesive layer, or may be formed by a method of applying the primer composition on one surface of the polyethylene terephthalate protection film.

[Polyethylene Terephthalate Protection Film]

The polarizing plate of the present invention is characterized in that the polyethylene terephthalate film is used as the protection film attached onto at least one surface of the polarizer. In this case, the polyethylene terephthalate protection film means a film manufactured by a resin where 80 mol % or more of a repeating unit is ethylene terephthalate, and is a concept including a film manufactured by a resin including a constitutional unit derived from the other copolymerization component in addition to an ethylene terephthalate unit.

In this case, examples of the other copolymerization component may include a dicarboxylic acid component such as isophthalic acid, p-β-oxyethoxybenzoic acid, 4,4'-dicarboxydiphenyl, 4,4'-dicarboxybenzophenone, bis(4-carboxyphenyl)ethane, adipic acid, sebacic acid, 5-sodiumsulfoisophthalic acid, and 1,4-dicarboxycyclohexane; a diol component such as propylene glycol, butanediol, neopentylglycol, diethylene glycol, cyclohexanediol, an ethylene oxide addition of bisphenol A, polyethylene glycol, polypropylene glycol, and polytetramethylene glycol, and the like. The dicarboxylic acid component or the diol component may be, if necessary, used in combination of two kinds or more. Further, oxycarboxylic acid such as p-oxybenzoic acid may be jointly used together with the carboxylic acid component or the diol component. As the other copolymerization component, a small amount of the dicarboxylic acid component and/or the diol component containing an amide bond, a urethane bond, an ether bond, a carbonate bond, or the like may be used.

Meanwhile, it is more preferable that the polyethylene terephthalate protection film be a stretched polyethylene terephthalate film. This is because in the case where the non-stretched polyethylene terephthalate film is used, when the non-stretched polyethylene terephthalate film is applied to an image display, due to a high retardation property of the polyethylene terephthalate film, a display quality may be reduced. Specifically, in the case where the non-stretched polyethylene terephthalate film is used, as described in the following Experimental Example 4, a rainbow phenomenon may occur.

More preferably, an in-plane retardation value of the stretched polyethylene terephthalate film may be about 4000 nm to 10000 nm. This is because in the case where the in-plane retardation value satisfies the aforementioned numerical range, generation of interference stripes caused by interference of light is suppressed and a more vivid and clearer image may be implemented.

Meanwhile, a low refraction coating layer may be formed on at least one surface of the polyethylene terephthalate protection film, but is not essential. Since the polyethylene terephthalate protection film has a relatively higher refractive index as compared to the triacetyl cellulose film and the like, in the case where the polyethylene terephthalate protection film is used as the protection film, light reflection on the surface of the protection film may be increased to reduce transmittance of the polarizing plate. Therefore, it is preferable that in order to prevent this, the low refraction coating layer be formed on the surface of the polyethylene terephthalate film. The low refraction coating layer may be formed on one surface or both surfaces of the polyethylene terephthalate protection film, and preferably, may be formed on a surface that is opposite to a surface on which the primer layer is formed. According to the exemplary embodiment of the present invention, the polarizing plate may further include a low refraction coating layer on a surface of the polyethylene terephthalate protection film, which is opposite to a counter surface of the primer layer. Specifically, the polarizing plate may further include a low refraction coating layer on a surface of the polyethylene terephthalate protection film, which is opposite to a surface facing the primer layer.

The low refraction coating layer may be formed by a resin composition where a low refractive index material having a low refractive index is mixed with the polymer resin, and in this case, as the polymer resin, for example, the acryl-based resin may be used, and as the low refractive index material, a fluorine-based compound such as 1,1,1-trifluoroethane, polyvinylidene fluoride (PVDF), polytetrafluoroethylene (PTFE, Teflon) hydrofluoro ether, hydrochlorofluorocarbon, hydrofluorocarbon, perfluorocarbon, perfluoropolyether, perfluorooctanoic acid (PFOA), perfluorooctane sulfonate (PFOS), and a perfluoroalkoxyfluoro polymer, a silica-based compound, or the like may be used.

[Polarizing Plate]

The polarizing plate of the present invention includes the water-based adhesive layer, the primer layer, and the polyethylene terephthalate protection film sequentially provided on at least one surface of the polarizer. In this case, the polyethylene terephthalate protection film may be provided on only one surface of the polarizer, or provided on both surfaces of the polarizer.

Figure 5:
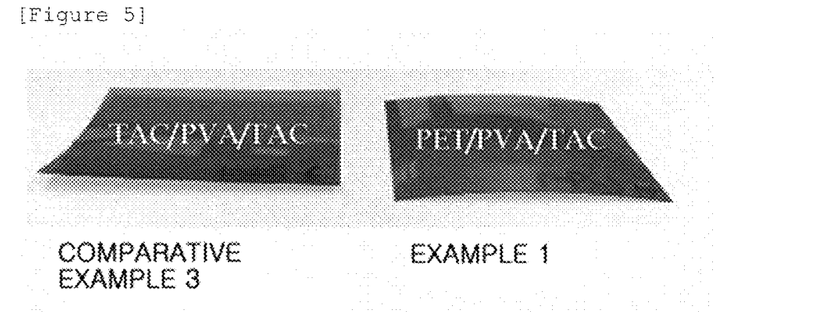
FIG. 5 is a picture illustrating a curl property of polarizing plates manufactured by Example 1 and Comparative Example 3.

Meanwhile, in the case where the polyethylene terephthalate protection film is provided on only one surface of the polarizer, a polymer film made of a different material, such as a triacetyl cellulose film, a cycloolefin polymer film, a norbornene film, a polycarbonate film, or an acryl film, may be provided on the other surface of the polarizer. In the case where the triacetyl cellulose film is provided, the water-based adhesive layer and/or the primer layer of the present invention may be provided between the triacetyl cellulose film and the polarizer. From the viewpoint that the same adhesive and primer composition may be used and production may be performed by one process, it is preferable to provide the triacetyl cellulose film on the other surface of the polarizer. Meanwhile, in the case where the polyethylene terephthalate film and the triacetyl cellulose film are used as the protection film of the polarizing plate, as illustrated in FIG. 5, due to a difference between shrinkage ratios of the polyethylene terephthalate film and the triacetyl cellulose film, after the polarizing plate is manufactured, a curl which is upwardly convex is generated toward the surface onto which the TAC film is attached. In the case where this polarizing plate is used as a polarizing plate (lower polarizing plate) of a backlight side of a liquid crystal display by disposing the TAC film to face a liquid crystal panel, an improvement effect of corner light leakage may be obtained.

Meanwhile, in the case where the cycloolefin polymer film, the norbornene film, the polycarbonate film, the acryl film, or the like is provided, it is preferable that a non-water-based adhesive layer be formed between the polymer films and the polarizer. This is because since these films have low moisture permeability, in the case where the water-based adhesive is used, a problem of difficulty of curing may occur.

Further, in the case where the polyethylene terephthalate protection film is provided on only one surface of the polarizer, a cohesive layer or an adhesive layer may be formed without the polymer film on the other surface of the polarizer. In this case, in the cohesive layer or the adhesive layer, a cohesive agent and/or an adhesive generally used in a polarizing plate technical field may be used without a limit, and the cohesive layer or the adhesive layer is not particularly limited.

Meanwhile, the polarizing plate of the present invention has very excellent adhesion force and water resistance properties as compared to the polarizing plate in the related art to which the polyethylene terephthalate film is applied. According to research of the present inventors, in the case of the aforementioned polarizing plate to which the water-based adhesive layer and the primer layer of the present invention are applied, even though the polyethylene terephthalate protection film is not subjected to separate surface reformation and the like, adhesion force between the water-based adhesive layer and the polyethylene terephthalate protection film is significantly improved. Specifically, the polarizing plate of the present invention has adhesion force improved by 500% or more as compared to the polarizing plate to which the polyethylene terephthalate protection film, which does not include the water-based adhesive layer or the primer layer, is applied.

The aforementioned polarizing plate of the present invention may be very usefully used in an image display such as a liquid crystal display and an organic light emitting display. Particularly, the polarizing plate of the present invention may be usefully used as a lower polarizing plate disposed at a backlight side of the liquid crystal display, but is not limited thereto. To be more specific, the present invention provides a liquid crystal display including: a liquid crystal display panel including an upper substrate, a lower substrate, and a liquid crystal cell interposed between the upper substrate and the lower substrate; a backlight unit disposed at a lower portion of the lower substrate; and the polarizing plate disposed between the liquid crystal panel and the backlight unit. In this case, it is preferable that in the polarizing plate of the present invention, the polyethylene terephthalate protection film be disposed to face the backlight unit side.

Further, as described above, in the case where the polarizing plate of the present invention is used as the lower polarizing plate of the liquid crystal display, the lower polarizing plate is particularly preferably a polarizing plate where the polyethylene terephthalate film is provided on one surface of the polarizer and the triacetyl cellulose film is provided on the other surface of the polarizer, but is not limited thereto.

Further, in the liquid crystal display, in the polarizing plate, the stretched polyethylene terephthalate film may be provided on one surface of the polarizer, the triacetyl cellulose film may be provided on the other surface of the polarizer, and the triacetyl cellulose film may be disposed at a liquid crystal display panel side. In this case, it is preferable that in the polarizing plate, the triacetyl cellulose film be disposed at the liquid crystal display panel side, and to this end, the cohesive layer may be provided on a surface of the triacetyl cellulose film, which is opposite to a lateral surface of the polarizer. Specifically, the cohesive layer may be provided on a surface of the triacetyl cellulose film, which is opposite to a surface facing the polarizer. This is because in this case, the polarizing plate has a curl which is convex in a direction of the liquid crystal panel, and thus a prevention effect of corner light leakage may be obtained.

[Manufacturing Method]

The polarizing plate of the present invention may be manufactured through steps of forming a primer layer and a water-based adhesive layer between a polarizer and a polyethylene terephthalate protection film; and attaching the polyethylene terephthalate protection film onto at least one surface of the polarizer via the water-based adhesive layer and the primer layer.

In this case, the water-based adhesive layer is formed by using a water-based adhesive including: a polyvinyl alcohol-based resin; an amine-based metal compound; and a pH adjuster including epoxy (meth)acrylate, alcohol, and acid.

Meanwhile, since a detailed content relating to the polarizer, the water-based adhesive layer, the primer layer, and the polyethylene terephthalate protection film is the same as that described in the above, a detailed description thereof will be omitted.

Meanwhile, the forming of the primer layer and the water-based adhesive layer may be performed so that the order of the polarizer/water-based adhesive layer/primer layer/polyethylene terephthalate protection film is satisfied, and the formation target or the formation order is not particularly limited. That is, the water-based adhesive layer and the primer layer may be simultaneously formed or may be sequentially formed at a difference of time, and in the case where the water-based adhesive layer and the primer layer are formed at a difference of time, the order thereof is not limited. Further, both the water-based adhesive layer and the primer layer may be formed on the polarizer or on the polyethylene terephthalate film, or the water-based adhesive layer may be formed on the polarizer and the primer layer may be formed on the polyethylene terephthalate film. For example, in the case where the water-based adhesive layer is formed by applying the water-based adhesive on at least one surface of the polarizer and the primer layer is formed by applying the primer composition on the polyethylene terephthalate film, formation of the primer layer and formation of the adhesive layer may be simultaneously performed. Meanwhile, in the case where the water-based adhesive layer is formed on one surface of the polarizer and the primer layer is then formed on the water-based adhesive layer, the water-based adhesive layer may be formed and the primer layer may be then formed. In the case where the primer layer is formed on one surface of the polyethylene terephthalate film and the water-based adhesive layer is then formed on the primer layer, after the formation of the primer layer, the water-based adhesive layer may be formed.

Further, a method of forming the water-based adhesive layer and/or the primer layer is not particularly limited, and may be performed by using a resin composition applying method well known in the corresponding technical field, for example, a kneading method, a Meyer bar coating method, a gravure coating method, a comma coating method, a doctor blade method, a die coating method, a dip coating method, a spray method, and the like.

If the water-based adhesive layer and the primer layer are formed through the aforementioned processes, the polarizer and the polyethylene terephthalate film are attached. In this case, the attachment may be performed by a method of laminating the polarizer and the polyethylene terephthalate film, followed by drying at a temperature of 20° C. to 100° C., preferably 30° C. to 100° C., and more preferably 40° C. to 100° C. to cure the water-based adhesive layer and the primer layer.

Meanwhile, the method for manufacturing the polarizing plate according to the present invention, if necessary, may further include attaching a triacetyl cellulose film, a cycloolefin polymer film, a norbornene film, a polycarbonate film, or an acryl film onto the other surface of the polarizer, on which the polyethylene terephthalate protection film is not laminated. The present step may be formed of a step of forming a second adhesive layer between the other surface of the polarizer and the triacetyl cellulose film, the cycloolefin polymer film, the norbornene film, the polycarbonate film, or the acryl film, and a step of laminating the polarizer and the triacetyl cellulose film, the cycloolefin polymer film, the norbornene film, the polycarbonate film, or the acryl film and then curing the second adhesive layer.

In this case, in the case where the film attached onto the other surface of the polarizer is the triacetyl cellulose film, the second adhesive layer may be formed according to the same component and formation method as the aforementioned water-based adhesive layer of the present invention, and if necessary, the primer layer of the present invention may be further formed between the second adhesive layer and the triacetyl cellulose film. In this case, the component and the formation method of the primer layer and the like are the same as those described in the above.

Meanwhile, in the case where the film attached onto the other surface of the polarizer is the cycloolefin polymer film, the norbornene film, the polycarbonate film, or the acryl film, it is preferable that the second adhesive layer be formed by a non-water-based adhesive, and it is preferable that after curing of the water-based adhesive layer formed at the polyethylene terephthalate protection film side is completed, the films be attached.

Hereinafter, the present invention will be described in more detail through the specific Examples. However, the following Examples are set forth to illustrate the present invention, but the scope of the present invention is not limited thereto.

PREPARATION EXAMPLE 1

Adhesive A

The polyvinyl alcohol resin containing the acetoacetyl group (5 wt %) (the average degree of polymerization of 2000, the degree of saponification of 94%, Nippon Synthetic Chemical Industry Co., Ltd.) was dissolved in pure water to manufacture the 4 wt % aqueous solution. The titanium amine complex crosslinking agent (trade name: TYZOR TE, DuPont Company) was added thereto at the ratio of 6.7 parts by weight of based on 100 parts by weight of the polyvinyl alcohol resin to be agitated. Thereafter, the pH adjuster including 5 parts by weight of glycidyl methacrylate, 28.5 parts by weight of methanol, and 66.5 parts by weight of hydrochloric acid was manufactured, and then added to the polyvinyl alcohol resin aqueous solution so that the pH was 7, thereby manufacturing Adhesive A.

PREPARATION EXAMPLE 2

Adhesive B

Adhesive B was manufactured by the same method as Preparation Example 1, except that the pH adjuster was not added.

PREPARATION EXAMPLE 3

Primer Composition

Ethylene glycol, 1,4-butanediol, terephthalic acid, and isophthalic acid were added at the mole ratio of 0.5:0.5:0.5:0.5, and esterification was performed to manufacture the polyester resin.

After the acryl resin (manufacturer: LG MMA) and the styrene resin (manufacturer: Aldrich Corporation) were mixed at the weight ratio of 5:5, 30 parts by weight of the mixture was added to 70 parts by weight of the polyester resin to manufacture the primer composition.

PREPARATION EXAMPLE 4

Polarizer

The polyvinyl alcohol film (Kyraray Co., Ltd., the degree of polymerization of 2000) having the thickness of μm was swollen in the pure solution at 25° C. for 75 seconds, and then subjected to the exhaustion process in the iodine solution having the concentration of 0.12 wt % at 30° C. for 80 seconds. Subsequently, the washing process was performed in the boric acid solution having the concentration of 0.12 wt % at 40° C. for 20 seconds, and elongation was performed by six times in the boric acid solution having the concentration of 3.5 wt % at 52° C. After elongation, the complementary coloring process was performed in the 5 wt % KI solution, followed by drying in the oven at 80° C. for 5 minutes to manufacture the polarizer.

EXAMPLE 1

The primer composition manufactured by Preparation Example 3 was applied on one surface of the polyethylene terephthalate film (PET, Teijin-DuPont Limited) to form the primer layer. Thereafter, the acryl resin mixed with 1,1,1-trifluoroethane was applied on the other surface of the PET film to form the low refraction coating layer.

After the triacetyl cellulose (TAC) film having the thickness of 60 μm was positioned on one surface of the polarizer manufactured by Preparation Example 4 and the PET film where the primer layer and the low refraction coating layer were formed was positioned on the other surface thereof, Adhesive A manufactured by Preparation Example 1 was interposed between the polarizer and the TAC film and between the polarizer and the PET film, and laminated by the laminator, followed by drying in the oven at 80° C. for 5 minutes, thereby manufacturing the polarizing plate. The manufactured polarizing plate had the structure of the low refraction coating layer/PET film/primer layer/adhesive layer (A)/polarizer/adhesive layer (A)/TAC film.

COMPARATIVE EXAMPLE 1

The polarizing plate was manufactured by the same method as Example 1, except that the primer layer and the low refraction coating layer were not formed in the polyethylene terephthalate protection film. The manufactured polarizing plate had the structure of the PET film/adhesive layer (A)/polarizer/adhesive layer (A)/TAC film.

COMPARATIVE EXAMPLE 2

The polarizing plate was manufactured by the same method as Example 1, except that Adhesive B manufactured by Preparation Example 2 was used instead of Adhesive A. The manufactured polarizing plate had the structure of the low refraction coating layer/PET film/primer layer/adhesive layer (B)/polarizer/adhesive layer (B)/TAC film.

COMPARATIVE EXAMPLE 3

The triacetyl cellulose (TAC) film having the thickness of 60 μm was positioned on both surfaces of the polarizer manufactured by Preparation Example 4, and Adhesive A manufactured by Preparation Example 1 was interposed between the polarizer and the TAC film, followed by lamination by the laminator and drying in the oven at 80° C. for 5 minutes, thereby manufacturing the polarizing plate having the structure of the TAC film/adhesive layer (A)/polarizer/adhesive layer (A)/TAC film.

EXPERIMENTAL EXAMPLE 1

Evaluation of Adhesion Force

Figure 1:
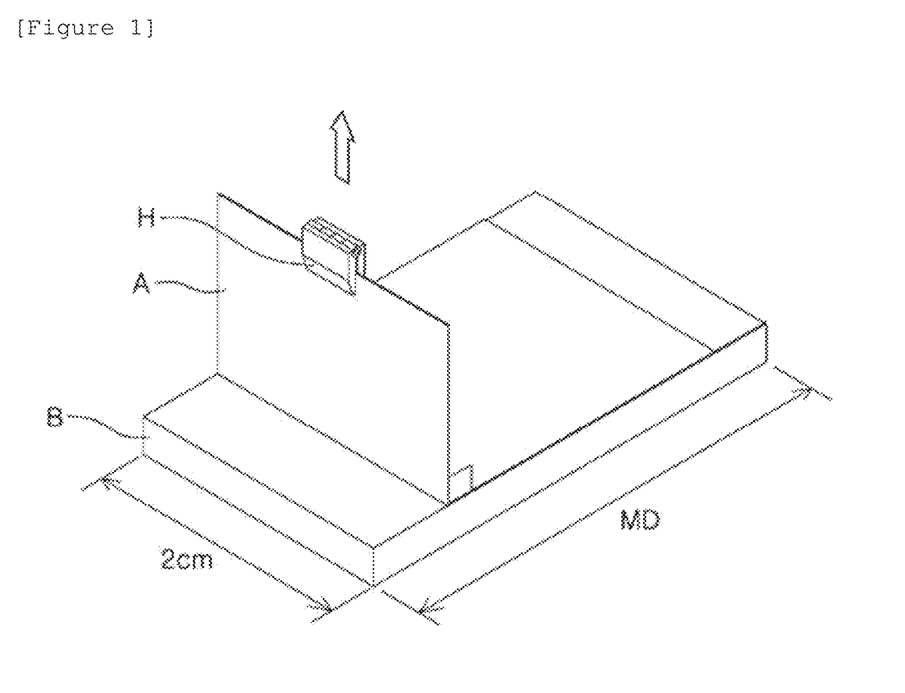
FIG. 1 is a view illustrating a measurement method of adhesion force of a polarizing plate.

Adhesion forces of the polarizing plates manufactured by Example 1, Comparative Example 1, and Comparative Example 2 were measured. In this case, adhesion force of the polarizing plate, as illustrated in FIG. 1, was measured by the method of fixing the polyvinyl alcohol film A of the polarizing plate sample cut in the width of 2 cm with the sample holder H and applying force in the direction vertical to the plane direction of the polarizing plate to measure force (90° stripping force) required to strip the polyvinyl alcohol film A from the protection film B, and as measurement equipment, the Texture Analyzer (Model Name: TA-XT Plus) manufactured by Stable Micro Systems Ltd. was used.

Figure 2:
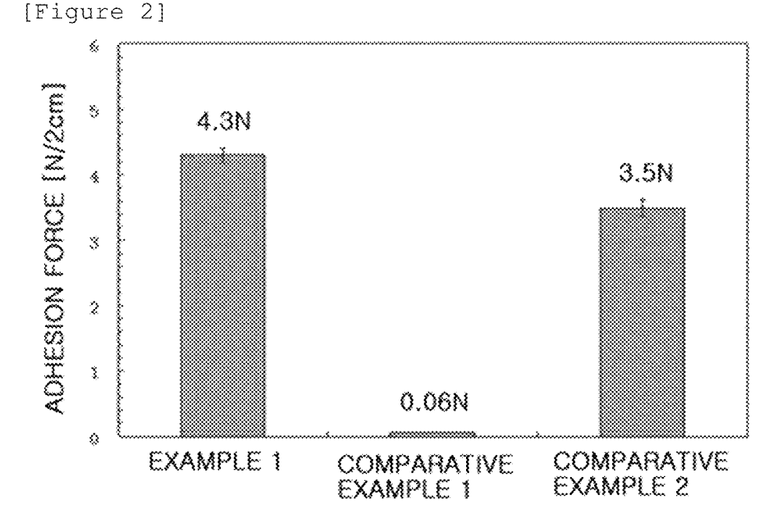
FIG. 2 is a view illustrating a test result of adhesion force of polarizing plates manufactured by Example 1, Comparative Example 1, and Comparative Example 2.

The measurement result of adhesion force is illustrated in FIG. 2. As illustrated in FIG. 2, it can be seen that in the case of the polarizing plates of Comparative Example 1 where the primer layer and the low refraction coating layer are not formed and Comparative Example 2 where the adhesive layer is formed by the adhesive to which the pH adjuster is not added, as compared to the polarizing plate of Example 1, adhesion force between the protection film and the polarizer is low. Particularly, in the case of Comparative Example 1 where the primer layer is not formed, adhesion force is very low.

EXPERIMENTAL EXAMPLE 2

Evaluation of Water Resistance

Figure 3:
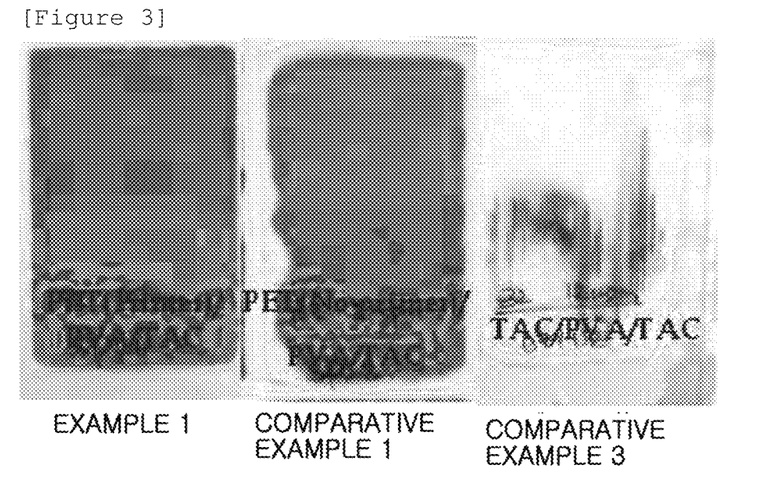
FIG. 3 is a view illustrating a test result of water resistance of polarizing plates manufactured by Example 1, Comparative Example 1, and Comparative Example 3.

After the polarizing plates manufactured by Example 1, Comparative Example 1, and Comparative Example 3 were immersed in water at 60° C. for 24 hours, the surface state was confirmed. FIG. 3 illustrates pictures obtained by photographing the surface states of the polarizing plates after immersion.

As illustrated in FIG. 3, it can be seen that in the case of the polarizing plate of Example 1, after immersion, the surface of the polarizing plate is cleanly maintained, but in the case of Comparative Examples 1 and 3, after immersion, stripping and decolorization occur. This is a phenomenon occurring because the adhesives of Comparative Examples 1 and 3 are dissolved in water to come into water and thus the protection film and the PVA film are not uniformly adhered but partially adhered. Further, since the PET film is a film having excellent water resistance, in the case where the PET film where the primer layer is formed and the polarizer are attached with sufficient adhesion force like Example 1, the polarizer having more excellent water resistance can be manufactured.

EXPERIMENTAL EXAMPLE 3

Evaluation of Optical Property

Simple substance transmittance and the degree of polarization of the polarizing plates manufactured by Example 1 and Comparative Examples 1 to 3 were measured by using the JASCO-V-7100 spectrophotometer. The measurement result is described in the following [Table 1].

TABLE 1

| Classification | Simple substance transmittance (Ts, %) | Degree of polarizing (%) |
| --- | --- | --- |
| Example | 42.83 | 99.9930 |
| Comparative Example 1 | 41.28 | 99.9928 |
| Comparative Example 2 | 42.81 | 99.9851 |
| Comparative Example 3 | 42.58 | 99.9923 |

As described in [Table 1], it can be seen that the polarizing plate of the Example has excellent transmittance and degree of polarization as compared to the polarizing plates of Comparative Examples 1 to 3. Particularly, it can be confirmed that in the polarizing plate of Example 1, even though the PET film is used as the protection film, an excellent optical property is secured as compared to Comparative Example 3 where the TAC film is used as the protection film.

EXPERIMENTAL EXAMPLE 4

Evaluation of Rainbow Phenomenon

Figure 4:
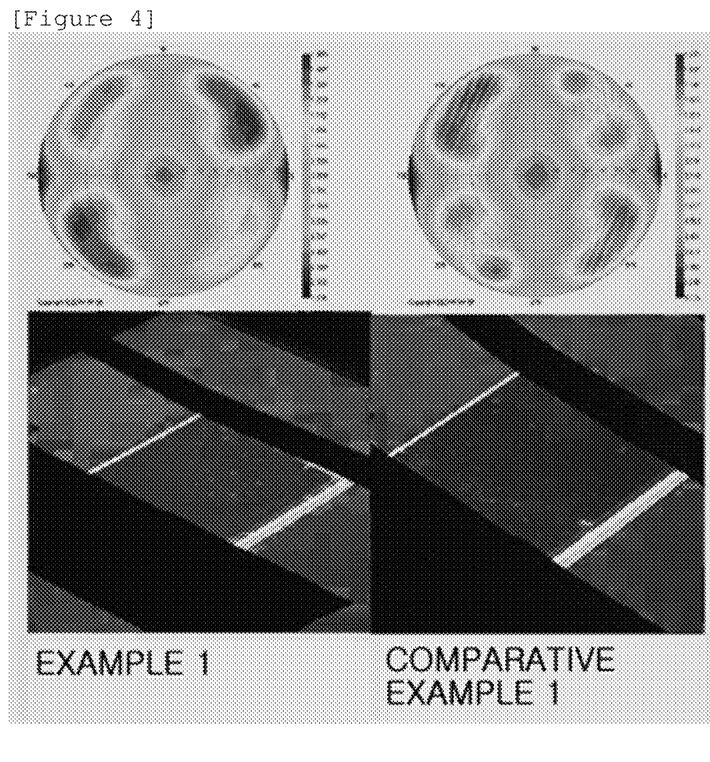
FIG. 4 is a view illustrating a measurement result of luminance of polarizing plates manufactured by Example 1 and Comparative Example 1.

After the polarizing plates manufactured by Example 1 and Comparative Example 1 were installed in the liquid crystal display, luminance was measured by using luminance measurement equipment (ELDIM, EZ Contrast Company). The measurement result of luminance is illustrated in FIG. 4. According to FIG. 4, it can be seen that in the case where the polarizing plate of Comparative Example 1 is installed, fluctuation in the luminance value is severe, and this means that the rainbow phenomenon is observed. On the other hand, it can be seen that in the case where the polarizing plate of Example 1 is installed, this phenomenon hardly exists.

EXPERIMENTAL EXAMPLE 5

Evaluation of Curl Property

After the cohesive layers were formed on the surfaces of the TAC films of the polarizing plates manufactured by Example 1 and Comparative Example 3 by using the acryl-based cohesive film, the curl property of the polarizing plate was confirmed with the naked eye. FIG. 5 illustrates a picture obtained by photographing the polarizing plates of Example 1 and Comparative Example 3 after the cohesive layer is formed. In this case, the polarizing plates were disposed so that the cohesive layer became the uppermost surface. As illustrated in FIG. 5, in the polarizing plate of Example 1, the curl that was upwardly convex was generated, but in the polarizing plate of Comparative Example 3, the curl that was downwardly convex was generated. There are problems in that in the case where the polarizing plate having the same curl property as Comparative Example 3 is attached to the liquid crystal panel, the sagging phenomenon of the central portion of the liquid crystal panel is deepened by the polarizing plate and the corner portion is lifted to increase the corner light leakage phenomenon. On the other hand, there is an effect in that in the case where the polarizing plate having the same curl as Example 1 is attached to the liquid crystal panel, sagging of the central portion of the liquid crystal panel may be suppressed to improve light leakage.

EXPERIMENTAL EXAMPLE 6

Evaluation of Stains of Adhesive

The degree of generation of the adhesive stains of the polarizing plates manufactured by Example 1 and Comparative Example 2 was measured. The degree of adhesive stains was measured with the naked eye after each of the polarizing plates manufactured by Example 1 and Comparative Example 2 was laminated on the LCD backlight and the polarizing plate manufactured by Comparative Example 3 was laminated on each of the polarizing plates so that absorption axes of the polarizing plates were orthogonal to each other.

Figure 6:
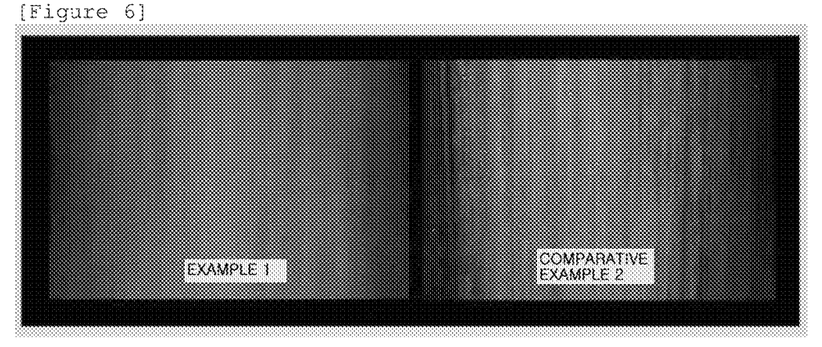
FIG. 6 is a picture illustrating the degree of stains of adhesives of polarizing plates manufactured by Example 1 and Comparative Example 2.

FIG. 6 illustrates a picture illustrating the degree of adhesive stains of the polarizing plates manufactured by Example 1 and Comparative Example 2. As illustrated in FIG. 6, it can be seen that in the case of the polarizing plate of Comparative Example 2, as compared to the polarizing plate of Example 1, the adhesive stains are very severely generated. Through the aforementioned result, it can be seen that in the case where the pH adjuster is added to the water-based adhesive, an improvement effect of the adhesion stains of the polarizing plate is secured.

The invention claimed is:

1. A polarizing plate comprising:
a water-based adhesive layer, a primer layer including an acryl-based unit, and a polyethylene terephthalate protection film sequentially provided on at least one surface of a polarizer,
wherein the water-based adhesive layer is applied to the at least one surface of the polarizer, and the primer layer is in contact with the polyethylene terephthalate protection film and the water-based adhesive layer,
wherein the polarizer is a polyvinyl alcohol-based film, a partially formalized polyvinyl alcohol-based film, or an ethylene vinyl acetate copolymer-partially saponified film, where molecular chains containing an iodine-based compound or a dichromatic polarizing material are aligned in a predetermined direction,
wherein the water-based adhesive layer is formed by using a water-based adhesive including a polyvinyl alcohol-based resin, an amine-based metal compound, and a pH adjuster,
wherein the water-based adhesive has a pH of 4 to 9, and comprises 1 to 50 parts by weight of the amine-based metal compound and 0.0001 to 5 parts by weight of the pH adjuster, based on 100 parts by weight of the polyvinyl alcohol-based resin, and wherein the pH adjuster comprises 0.001 to 10 parts by weight of epoxy (meth)acrylate, 10 to 50 parts by weight of alcohol, and 30 to 80 parts by weight of acid, based on 100 parts by weight of the pH adjuster.

2. The polarizing plate of claim 1, wherein the polyvinyl alcohol-based resin included in the water-based adhesive is a polyvinyl alcohol-based resin containing an acetoacetyl group.

3. The polarizing plate of claim 1, wherein the epoxy (meth)acrylate is glycidyl methacrylate, the alcohol is methanol, and the acid is hydrochloric acid.

4. The polarizing plate of claim 1, wherein the primer layer includes the acryl-based unit and a polyester unit.

5. The polarizing plate of claim 4, wherein the primer layer further includes a styrene-based unit.

6. The polarizing plate of claim 1, wherein the polyethylene terephthalate protection film is a stretched polyethylene terephthalate film.

7. The polarizing plate of claim 6, wherein an in-plane retardation value of the stretched polyethylene terephthalate film is 4000 nm to 10000 nm.

8. The polarizing plate of claim 6, wherein the stretched polyethylene terephthalate film is provided on one surface of the polarizer, and a triacetyl cellulose film, a cycloolefin polymer film, a norbornene film, a polycarbonate film, an acryl film, or a polyethylene terephthalate film is provided on the other surface of the polarizer.

9. The polarizing plate of claim 8, wherein the triacetyl cellulose film is provided on the other surface of the polarizer.

10. The polarizing plate of claim 9, wherein a cohesive layer is formed on a surface of the triacetyl cellulose film, which is opposite to a lateral surface of the polarizer.

11. The polarizing plate of claim 1, further comprising:
a low refraction coating layer on a surface of the polyethylene terephthalate protection film, which is opposite to a surface facing the primer layer.

12. A method for manufacturing a polarizing plate, the method comprising:
forming a primer layer including an acryl-based unit, and a water-based adhesive layer between a polarizer and a polyethylene terephthalate protection film; and
attaching the polyethylene terephthalate protection film onto at least one surface of the polarizer via the water-based adhesive layer and the primer layer,
wherein the water-based adhesive layer is applied to the at least one surface of the polarizer, and the primer layer is in contact with the polyethylene terephthalate protection film and the water-based adhesive layer,
wherein the polarizer is a polyvinyl alcohol-based film, a partially formalized polyvinyl alcohol-based film, or an ethylene vinyl acetate copolymer-partially saponified film, where molecular chains containing an iodine-based compound or a dichromatic polarizing material are aligned in a predetermined direction,
wherein the water-based adhesive layer is formed by using a water-based adhesive including: a polyvinyl alcohol-based resin; an amine-based metal compound; and a pH adjuster,
wherein the water-based adhesive has a pH of 4 to 9, and comprises 1 to 50 parts by weight of the amine-based metal compound and 0.0001 to 5 parts by weight of the pH adjuster, based on 100 parts by weight of the polyvinyl alcohol-based resin, and wherein the pH adjuster comprises 0.001 to 10 parts by weight of epoxy (meth)acrylate, 10 to 50 parts by weight of alcohol, and 30 to 80 parts by weight of acid, based on 100 parts by weight of the pH adjuster.

13. The method of claim 12, wherein the attaching of the polyethylene terephthalate protection film onto at least one surface of the polarizer is performed by a method of laminating the polarizer and the polyethylene terephthalate protection film and then performing drying at a temperature of 20° C. to 100° C. to cure the water-based adhesive layer and the primer layer.

14. The method of claim 12, further comprising:
attaching a triacetyl cellulose film, a cycloolefin polymer film, a norbornene film, a polycarbonate film, or an acryl film onto the other surface of the polarizer, on which the polyethylene terephthalate protection film is not laminated.

15. An image display comprising:
the polarizing plate of claim 1.

16. A liquid crystal display comprising:
a liquid crystal display panel including an upper substrate, a lower substrate, and a liquid crystal cell interposed between the upper substrate and the lower substrate;
a backlight unit disposed at a lower portion of the lower substrate; and
the polarizing plate of claim 1 disposed between the liquid crystal display panel and the backlight unit.

17. The liquid crystal display of claim 16, wherein the polarizing plate includes a stretched polyethylene terephthalate film on one surface of the polarizer and a triacetyl cellulose film on the other surface of the polarizer, and the triacetyl cellulose film is disposed at a liquid crystal display panel side.

* * * * *